United States Patent
Oikonomou et al.

(10) Patent No.: US 12,387,386 B2
(45) Date of Patent: Aug. 12, 2025

(54) SYSTEM AND METHOD FOR IMPROVING GRAPHICAL USER INTERFACE RENDERING

(71) Applicant: Think Silicon Research and Technology Single Member S.A., Rion Achaias (GR)

(72) Inventors: Ioannis Oikonomou, Patras (GR); Georgios Keramidas, Patras (GR)

(73) Assignee: Think Silicon Research and Technology Single Member S.A., Rion Achaias (GR)

( * ) Notice: Subject to any disclaimer, the term of this patent is extended or adjusted under 35 U.S.C. 154(b) by 163 days.

(21) Appl. No.: 17/931,453

(22) Filed: Sep. 12, 2022

(65) Prior Publication Data

US 2023/0082747 A1  Mar. 16, 2023

Related U.S. Application Data

(60) Provisional application No. 63/242,859, filed on Sep. 10, 2021.

(51) Int. Cl.
| | | |
|---|---|---|
| *G06F 11/00* | (2006.01) | |
| *G06F 3/048* | (2013.01) | |
| *G06T 11/00* | (2006.01) | |

(52) U.S. Cl.
CPC .............. *G06T 11/00* (2013.01); *G06F 3/048* (2013.01)

(58) Field of Classification Search
CPC ................................. G06T 11/00; G06F 3/048
USPC ....................................................... 345/619
See application file for complete search history.

(56) References Cited

U.S. PATENT DOCUMENTS

| | | |
|---|---|---|
| 7,039,875 B2 | 5/2006 | Khalfay et al. |
| 9,307,224 B2 | 4/2016 | Ko et al. |
| 9,686,495 B2 | 6/2017 | Yun et al. |
| 10,084,476 B1 * | 9/2018 | Zhao .............. H03M 7/3084 |
| 10,832,449 B1 | 11/2020 | Russo et al. |

(Continued)

OTHER PUBLICATIONS

International Search Report for PCT Application No. PCT/IB2022/058594, mailed Jan. 4, 2023. The International Bureau of WIPO.

(Continued)

*Primary Examiner* — Jin Ge
(74) *Attorney, Agent, or Firm* — M&B IP Analysts, LLC

(57) ABSTRACT

A system and method for improved compression of a graphical user interface (GUI) receives a first graphical user interface (GUI), the GUI including a GUI object. The method further includes compressing the first GUI, wherein the compressed first GUI is associated with a first compression ratio; generating a second GUI based on the GUI object of the first GUI, wherein the second GUI is different from the first GUI; compressing the second GUI, wherein the compressed second GUI is associated with a second compression ratio; generating an instruction which when executed configures a computer device to render the second GUI, in response to determining that the second compression ratio is higher than the first compression ratio; and generating an instruction which when executed configures the computer device to render the first GUI, in response to determining that the second compression ratio is lower than the first compression ratio.

21 Claims, 9 Drawing Sheets

(56) References Cited

U.S. PATENT DOCUMENTS

| | | | |
|---|---|---|---|
| 11,379,092 B2 | 7/2022 | Magureanu et al. | |
| 11,386,356 B2 | 7/2022 | Barrett et al. | |
| 2006/0004725 A1 | 1/2006 | Abraido-Fandino | |
| 2014/0282055 A1* | 9/2014 | Engel | G06F 3/0482 |
| | | | 715/744 |
| 2015/0172774 A1* | 6/2015 | Taniuchi | H04N 21/4312 |
| | | | 725/60 |
| 2016/0011657 A1* | 1/2016 | Estacio | G06V 40/193 |
| | | | 345/156 |
| 2016/0231870 A1* | 8/2016 | Summa | G06F 3/0481 |
| 2019/0317739 A1 | 10/2019 | Turek et al. | |
| 2019/0339824 A1 | 11/2019 | Hamedi et al. | |
| 2020/0104148 A1 | 4/2020 | R et al. | |
| 2020/0356591 A1 | 11/2020 | Yada et al. | |
| 2021/0289317 A1* | 9/2021 | Son | H04W 4/021 |
| 2022/0270209 A1* | 8/2022 | Mironica | H04N 19/86 |

OTHER PUBLICATIONS

Kang Byeongkeun et al: "Generating Images in Compressed Domain Using Generative Adversarial Networks", IEEE Access, IEEE, USA, vol. 8, Sep. 29, 2020 (Sep. 29, 2020), pp. 180977-180991, XP011814322, DOI: 10.1109/ACCESS.2020.3027800 [retrieved on Mar. 17, 2023].

Liu Ming-Yu et al: "Generative Adversarial Networks for Image and Video Synthesis: Algorithms and Applications", Proceedings of the IEEE, IEEE. New York, US, vol. 109, No. 5, Feb. 1, 2021 (Feb. 1, 2021), pp. 839-862, XP011851756, ISSN: 0018-9219, DOI: 10.1109/JPROC.2021.3049196.

Written Opinion of the International Searching Authority for PCT Application No. PCT/IB2022/058594, mailed Jan. 4, 2023. The International Bureau of WIPO.

Zhao Tianming et al: GUIGAN: Learning to Generate GUI Designs Using Generative Adversarial Networks [V2] II f arXiv.org, Jan. 27, 2021 (Jan. 27, 2021), pp. 1-13, XP55879924, Retrieved from the Internet: URL: https://arxiv.org/pdf/2101.09978.pdf [retrieved on Mar. 17, 2023].

\* cited by examiner

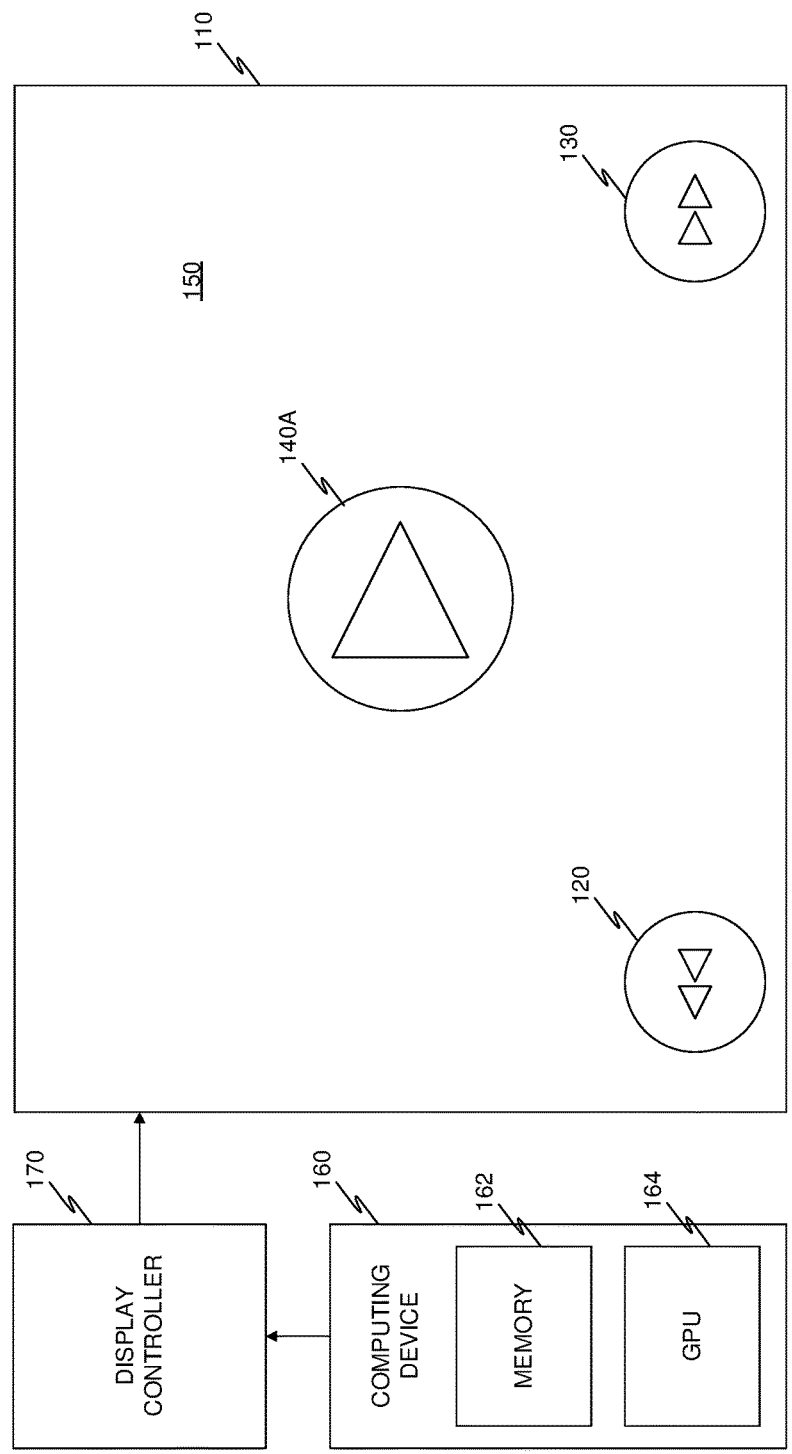

SYSTEM AND METHOD FOR IMPROVING GRAPHICAL USER INTERFACE RENDERING

CROSS-REFERENCE TO RELATED APPLICATIONS

This application claims the benefit of U.S. Provisional Application No. 63/242,859 filed on Sep. 10, 2021, the contents of which are hereby incorporated by reference.

TECHNICAL FIELD

The present disclosure relates generally to generating computer graphics images and particularly to generating images where the underlying rendering system supports block based aggressive lossy compression techniques for storing and preprocessing texture images.

BACKGROUND

Computing devices are becoming increasingly prevalent, as are screens and displays which are connected to the computing devices and used to display information, often through, or including, a graphical user interface (GUI). Screens are found in computers, tablets, smartphone, smartwatches, televisions, and the like. An image for a display is typically rendered using a graphic processing unit (GPU) which utilizes a memory, such as a framebuffer, when rendering the image for the display. The GPU is a class of computer processor which is optimized to perform parallel processing.

Televisions for example come with an on-screen display (OSD), which is a type of GUI often superimposed upon a rendered image. As another example, smart watches have widgets (or complications) which are tied to a specific function, such as executable code, and used to display information on a display of the watch.

An OSD, watch complication, and the like, are often secondary graphics to a primary graphic. In the example of an OSD the primary graphic is the content displayed on the television. Secondary graphics may be of less interest to a user, therefore if rendering them causes an issue, a user may become aggravated at this result, which is undesirable.

Additionally, various GUI configurations are rendered on various devices, where it is beneficial to save on processing and memory resources. For example, internet of things (IoT) devices, smartwatches, and the like, have a physically small form factor which results in small batteries and energy storages. These are able to operate for shorter amounts of time if processing and memory resources are mismanaged. By reducing processing and memory usage, device prices can be reduced, user viewing experience can be improved (for example by directing processing and memory resources to the images or video which the user is interested in, instead), and engagement is increased, all of which is beneficial.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improved compression of a graphical user interface (GUI). The method comprises: receiving a first graphical user interface (GUI), the GUI including a GUI object; compressing the first GUI, wherein the compressed first GUI is associated with a first compression ratio; generating a second GUI based on the GUI object of the first GUI, wherein the second GUI is different from the first GUI; compressing the second GUI, wherein the compressed second GUI is associated with a second compression ratio; generating an instruction which when executed configures a computer device to render the second GUI, in response to determining that the second compression ratio is higher than the first compression ratio; and; generating an instruction which when executed configures the computer device to render the first GUI, in response to determining that the second compression ratio is lower than the first compression ratio.

Certain embodiments disclosed herein also include a non-transitory computer readable medium having stored thereon causing a processing circuitry to execute a process, the process comprising: receiving a first graphical user interface (GUI), the GUI including a GUI object; compressing the first GUI, wherein the compressed first GUI is associated with a first compression ratio; generating a second GUI based on the GUI object of the first GUI, wherein the second GUI is different from the first GUI; compressing the second GUI, wherein the compressed second GUI is associated with a second compression ratio; generating an instruction which when executed configures a computer device to render the second GUI, in response to determining that the second compression ratio is higher than the first compression ratio; and generating an instruction which when executed configures the computer device to render the first GUI, in response to determining that the second compression ratio is lower than the first compression ratio.

Certain embodiments disclosed herein also include a system for improved compression of a graphical user interface (GUI). The system comprises: a processing circuitry; and a memory, the memory containing instructions that, when executed by the processing circuitry, configure the system to: receive a first graphical user interface (GUI), the GUI including a GUI object; compress the first GUI, wherein the compressed first GUI is associated with a first compression ratio; generate a second GUI based on the GUI object of the first GUI, wherein the second GUI is different from the first GUI; compress the second GUI, wherein the compressed second GUI is associated with a second compression ratio; generate an instruction which when executed configures a computer device to render the second GUI, in response to determining that the second compression ratio is higher than the first compression ratio; and generate an instruction which when executed configures the computer device to render the first GUI, in response to determining that the second compression ratio is lower than the first compression ratio.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1A is a schematic illustration of a display with a graphical user interface (GUI) overlay, implemented in accordance with an embodiment.

DETAILED DESCRIPTION

Figure 1B:
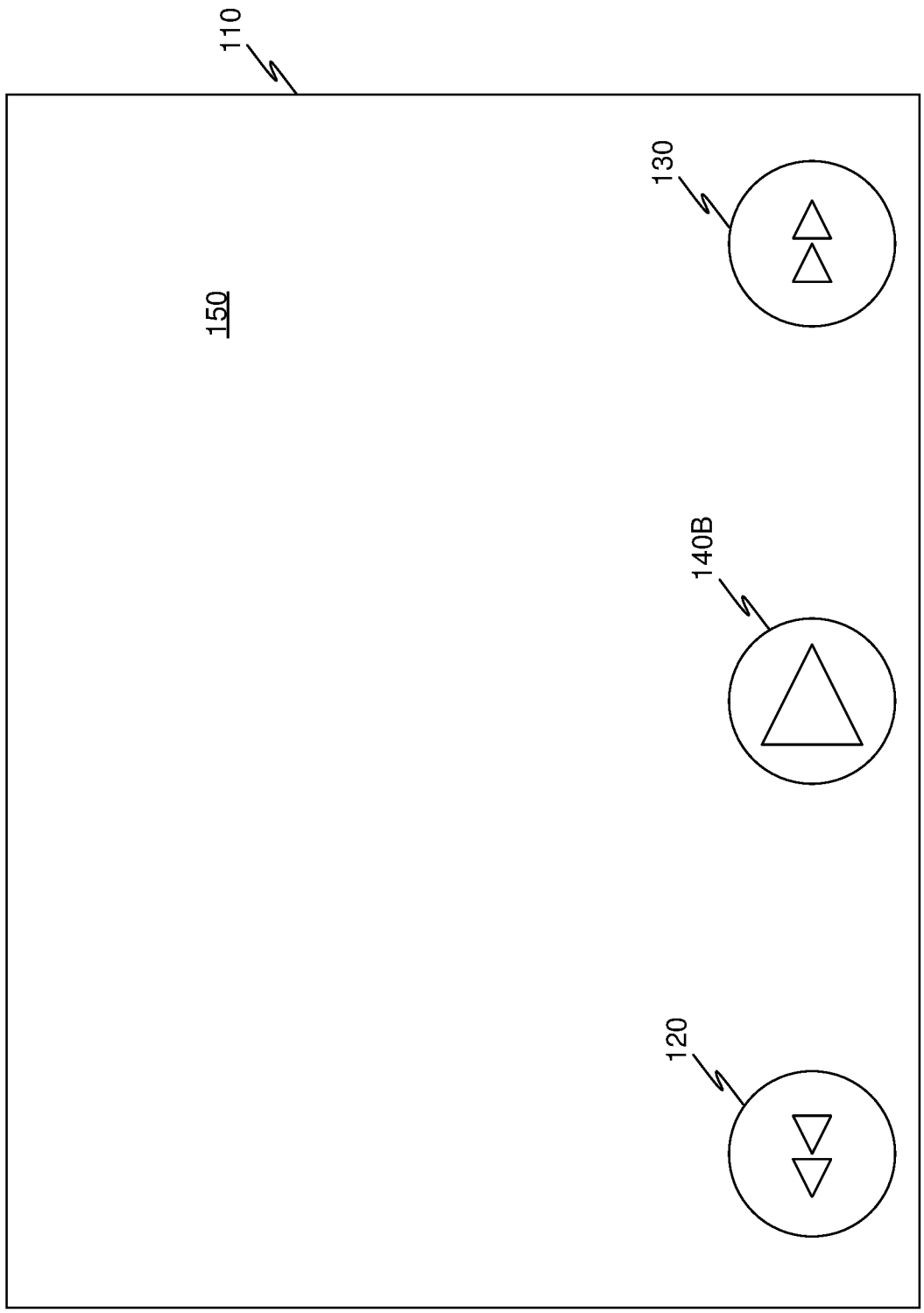
FIG. 1B is a schematic illustration of another display with an alternative GUI, implemented in accordance with another embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reducing compute resources when rendering a graphical user interface. The system disclosed receives a graphical user interface (GUI) which includes a graphical element. In an embodiment, the graphical element is interactive, meaning that a user using a computing device displaying the graphical user interface can interact, for example via a touchscreen, mouse, keyboard, and the like, with the graphical element. In an embodiment, interacting with a graphical element configures the computing device to perform a predetermined action. In certain embodiments, a second GUI is generated based on the received GUI. In some embodiments, a plurality of second GUIs are generated, each having different features. A different feature may be, for example, replacing a graphical element with another graphical element, changing a color of a graphical element, changing a color scheme of a graphical element, changing a position of a graphical element, changing a size of a graphical element, a combination thereof, and the like. In an embodiment, a second GUI is compressed to determine a compression ratio between a file size of the second GUI and the file size of the compressed second GUI. A graphical user interface is stored, in an embodiment, as a file, plurality of files, and the like. In an embodiment, a GUI size is based on a number of bits required to store the GUI. In certain embodiments, a check is performed to determine if the second GUI is more compressible than the first GUI. In an embodiment, a graphical user interface is more compressible if the compressed file size of one GUI is smaller than the compressed file size of another GUI.

Graphic user interfaces (GUIs) such as on-screen displays and widgets may be compressed to reduce the amount of compute resources in both processing and memory used to render them. In an embodiment a first GUI is received and a second GUI is generated based on an object (or graphical element) of the first GUI, wherein the second GUI has a higher compression ratio than the first GUI. In an embodiment the second GUI is generated by a generative adversarial network (GAN).

In some embodiments a first object of the first GUI is replaced with a second object of a second GUI, resulting in a higher compression ratio for the second GUI. In yet another embodiment, moving a first GUI object from a first display location to a second display location results in a higher compression ratio for the GUI. In an embodiment, a compression ratio is generated based on a determined file size of a GUI, and a determined file size of a compressed GUI.

In some instances block compression of a frame leads to artifact generation, which is not desirable as it reduces the user experience. It is therefore beneficial to avoid this result if possible.

For example, block compression may result in poor image quality in image blocks having many different color tints (e.g. more than two). This may occur in image blocks in which the colors include near black, near white, and some other, more saturated colors. In such cases, two encoded colors, along with implied or interpolated colors, may not accurately represent the colors of a source image block. This is because blending two of the three colors may not produce the third color.

As another example, endpoint precision beneath a predetermined value, coupled with a number of interpolants below a threshold can generate undesirable noise on color gradients; this is usually termed as a blocking effect. The effect is more pronounced when the color gradients are oriented diagonally within the block.

As yet another example, compression of a frame may result in low image quality in image blocks that have multiple separate color gradients at different orientations in the color space. This is because one or more of the color gradients must be ignored during the encoding process. This occurs frequently in images known as bump maps.

The disclosed embodiments improve results of a compression by generating an alternate graphical user interface for an input graphical interface, where the alternate graphical user interface is optimized for compression.

Figure 1C:
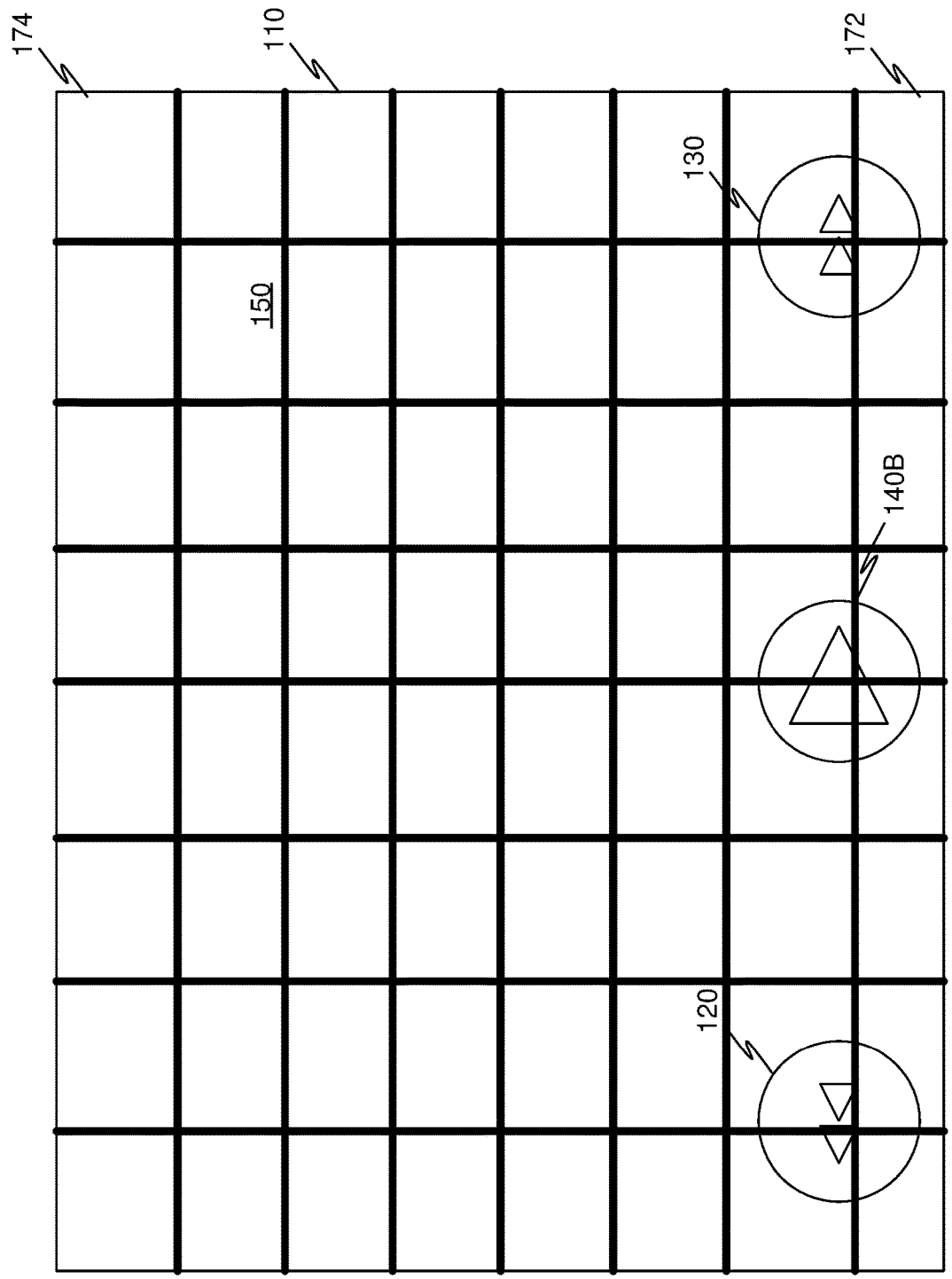
FIG. 1C is an example schematic illustration of the alternative GUI with gridlines indicating blocks for compression, utilized to describe an embodiment.

FIG. 1A is an example schematic illustration of a display with a graphical user interface (GUI) overlay, implemented in accordance with an embodiment. FIG. 1B is an example schematic illustration of another display with an alternative GUI, implemented in accordance with another embodiment. FIG. 1C is an example schematic illustration of the alternative GUI with gridlines indicating blocks for compression, utilized to describe an embodiment.

In an embodiment, a display 110 is configured to display images, multimedia, text, and the like, such as image 150. In certain embodiments, a computing device 160 is configured to render images for display, for example by utilizing a graphical processor unit (GPU) 164. A computing device 160 may be, for example, a television, a computer, a laptop, a tablet device, a smartwatch, a smartphone, an e-reader, an electronic shelf label, and the like.

In some embodiments, the computing device 160 is connected to the display 110 via a display controller 170. In an embodiment, the display controller 170 includes an integrated circuit (IC) which is configured to receive or read a frame from a framebuffer and generate a video signal which causes a display to display the frame.

In some embodiments, the computing device 160 is configured to utilize the GPU 164 for rendering a GUI overlay. In an embodiment, a GUI overlay includes graphical elements which are rendered over a primary content. For example, the image 150 is the primary content, and a first graphical element 120 is rendered over the image 150 as an overlay. In an embodiment, a plurality of graphic elements are rendered as an overly, such that objects (i.e., graphical elements of the GUI) are displayed over the image 150. GUI objects may be, for example, menus, buttons, closed captions, and the like.

Referring to FIG. 1A, the GUI overlay includes three GUI buttons, namely a first graphical element 120, a second graphical element 130 and a third graphical element 140A. The first graphical element 120 represents an instruction to rewind a content, such as a video content. The second graphical element 130 represents an instruction to fast forward, the third graphical element 140A represent an instruction to play the content. For example in an embodiment, each graphical element, when interacted with, configures the computing device to perform an instruction associated with the respective graphical element.

In an embodiment, each element of a GUI overlay further includes a position, relative position, and the like instructions to render the graphical element in a position on the display. In an embodiment, a position is defined by coordinates. For example, a position is defined by (x,y) coordinates. The play button (i.e., third graphical element 140A) includes instructions to render the graphical element 140A in the center of the display. For example, in relative coordinates the instruction includes rendering the graphical element at (0.5 X, 0.5 Y), where 'X' and 'Y' represent each the total dimension of a two dimensional display. In an embodiment, the graphical element 140 is circular, and has a diameter larger than a diameter of each of the first graphical element 120 and second graphical 130 element.

In certain embodiments it is beneficial to compress displayed content, such as media content, pictures, videos, and the like. This may be done in order to improve utilization of memory 162 of the computing device 160, decrease power consumption by the GPU 164, and the like.

The display 110 includes a displayed frame which, when rendered, includes image 150, the first graphical element 120, the second graphical element 130, and third graphical element 140A. A frame includes all objects rendered at a point in time, i.e., an image which is part of a sequence of images displayed in series.

FIG. 1B shows an alternative GUI, where an alternative third graphical 140B (alternative play button) is of a diameter which is approximately equal, or equal, to a diameter of first graphical element 120 and the second graphical element 130. The frame displayed in FIG. 1B is different than the frame displayed in FIG. 1A. For example, the third graphical element 140A and third graphical element 140B are of different size and different position.

In an embodiment, the computing device 160 is configured to compress a frame, or graphical objects which are included in the frame. Graphical objects may be, for example, the first graphical element 120, the content 150, and the like. A compressed frame has a size, e.g., a number of bits which when stored in memory represent the compressed frame. In an embodiment, compressing the frame of FIG. 1A results in a compressed frame having a size which is different than a size of a compressed frame of FIG. 1B.

In certain embodiments, it is advantageous to generate an alternative GUI in order to increase compressibility of a GUI. Compressibility describes the degree to which information can be compressed. In an embodiment, increasing compressibility means that an image can be stored using less bits, which is a reduction in memory usage. Generating an alternative GUI which is more compressible than another GUI having the same functionality, is therefore desirable.

In an embodiment, a compressed first GUI has a size which is larger than a compressed second GUI. In certain embodiments, the first GUI and second GUI include the same functionality. Functionality includes the actions which can be requested or initiated through the GUI. For example, a play button may be rendered using several different graphical elements, each of which, when interacted with, causes the same function to execute, for example by way of executing a computer instruction.

In an embodiment, A GUI generator, discussed in more detail below, is configured to generate an alternative GUI based on an input GUI. For example, the GUI of FIG. 1A which includes certain graphical elements arranged in a first position can be used as an input for a GUI generator to generate an alternative GUI having corresponding graphical elements arranged in a second position. In an embodiment, the GUI generator includes a recommendation engine to generate a recommendation for replacing a graphic element with another graphic element, the another graphic element having a higher compressibility. In certain embodiment, the another graphic, when compressed with an image (such as content 150), leads to less visual artifacts than compressing the image with the graphic element. Utilizing a compression with the alternative graphic element results in less visible loss as perceived by a user. This is advantageous as users are interested in experiencing a lossless visual display (e.g., little to no artifacts), while at the same time some loss may not be discernable to a human eye, allowing a system, such as the computing device 160, to utilize less compute resources, memory resources, or a combination thereof, when rendering a frame for display.

In certain embodiments the alternative GUI includes graphic widgets that are compressed with aggressive block based lossy compression techniques.

In an embodiment an alternative GUI includes a color, a mix of colors (i.e. color palette), and the like, for a particular graphical element, which is different than a color of a respective graphical element in the input GUI. This is advantageous as, for example, suggesting colors which are represented by similar values (e.g., RGB values) allows greater compression without reduction in quality.

In some embodiments a recommendation engine is configured to determine a location in a rendered frame in which a particular widget should be located, in order to increase compressibility of the frame. In another embodiment the recommendation engine is configured to generate a recommendation including which parts of a rendered frame a particular widget should be placed. In some embodiments a recommendation engine is configured to generate a recommendation which includes a spatial orientation of a particular widget in a particular frame. The spatial orientation recommendation minimizes visual artifacts, in an embodiment.

In certain embodiments, the recommendation engine is configured to generate a recommendation in response to detecting a difference between an input GUI and an alternative GUI generated based on the input GUI.

In an embodiment, detecting a difference includes receiving a first GUI descriptor and a second GUI descriptor. A GUI descriptor may be, for example, a markup language document. A GUI descriptor includes, in an embodiment, a plurality of GUI elements, each element including an identifier, a graphical element, and a location indicator based upon which the graphical element is rendered on a display. In an embodiment, the location indicator is a coordinate set, a relative coordinate set, and the like.

In certain embodiments, the recommendation engine is configured to generate a recommendation based on the alternative GUI, in response to detecting that the alternative GUI is more compressible than the input GUI. In some embodiments, comparing compressibility is determined by selecting a sample content, generating a first frame based on the content and the input GUI, and generating a second frame based on the content and the alternative GUI. The first frame and the second frame are compressed using the same compression technique. A file size (i.e., number of bits required to store a frame) of each compressed frame is compared, to determine which file size is smaller.

In some embodiments, a recommendation is generated in response to determining that the file size of the second compressed frame is smaller by a predefined threshold than the file size of the first compressed frame. For example, a recommendation is generated when the file size of the compressed second frame is smaller by a certain number of bits than the file size of the compressed first frame. As another example, the recommendation is generated when the compressed file size of the second frame is smaller by a predefined percentage (e.g., ten percent) than the file size of the compressed second frame.

In some embodiments, a GUI element further includes an action. The GUI element, when interacted with, is configured to initiate the action. For example, the action may be a predefined computer instruction which when executed by a processing circuitry of a computing device configures the computing device to display a content.

In an embodiment, a widget is a GUI element which corresponds to a particular module of code. A widget may be also called a complication, for example in digital watch displays. In some embodiments, interaction with a widget initiates a processor or processing circuitry to execute a code.

In certain embodiments the recommendation engine is configured to generate a recommendation which includes a graphical element, such as a pop up menu, a text display, and the like. In an embodiment the recommendation engine is configured to generate a recommendation based on a combination of widgets, the color of the widgets, their orientation and the like. A recommendation generated by a recommendation engine includes, in an embodiment, a notification to a user, generated based on a predefined text, and based on a detected difference between a first GUI and a second GUI.

In certain embodiments, a frame is compressed per frame block. A frame block is a portion of a frame, achieved, in an embodiment, by dividing a frame into predefined areas, such as by using a grid. For example, a first frame block 172 is compressed by applying a compression to a group of bits representing information needed to render the first frame block 172. A frame block, such as second frame block 174 is a logical division of a frame, which includes in an embodiment a plurality of pixels which are all within the frame block 174. In an embodiment, frame blocks are of equal size, such that the number of pixels in first frame block 172 is equal to the number of pixels within the second frame block 174. In some embodiments, frame blocks are of different sizes, such that the number of pixels in first frame block 172 is greater or smaller than the number of pixels in the second frame block 174.

In an embodiment, the computing device 160 includes at least one processing element, for example, a central processing unit (CPU), or a graphic processing unit (GPU). In an embodiment, the processing element may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing element is coupled via a bus to a memory 162. The memory 162 may include a memory portion that contains instructions that when executed by the processing element performs the method described in more detail herein. The memory 162 may be further used as a working scratch pad for the processing element, a temporary storage, and others, as the case may be. The memory may be a volatile memory such as, but not limited to random access memory (RAM), or non-volatile memory (NVM), such as, but not limited to, Flash memory.

The processing element and/or the memory 162 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 2:
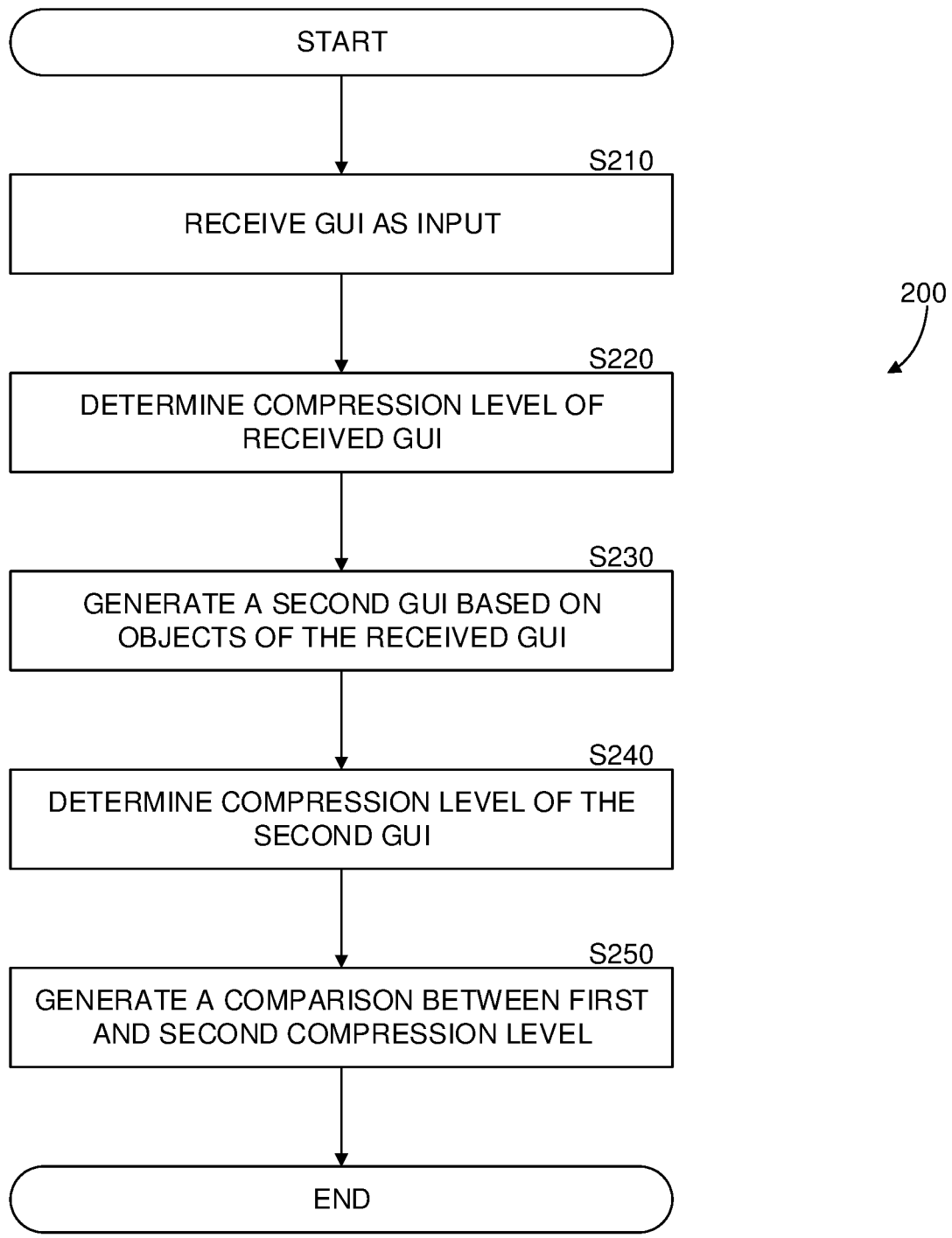
FIG. 2 is a flowchart of a method for generating a compressible GUI, implemented in accordance with an embodiment.

FIG. 2 is an example flowchart 200 of a method for generating a compressible GUI, implemented in accordance with an embodiment.

At S210, a first GUI is received. In an embodiment, the first GUI is received as an input for a GUI generator. The first GUI includes a GUI object, and a location indicator of the GUI object in a frame. In an embodiment the GUI object is rendered on a display in a position which is based on the location indicator. A location indicator is, for example, a coordinate set, a relative coordinate set, and the like. The placement of GUI objects within a frame is also referred to as a GUI layout.

In some embodiments, a GUI object further includes an associated action. An associated action is, for example, a code or other computer instruction. In certain embodiments, interacting with a GUI object initiates execution of the associated action. For example, a GUI object may be a "PLAY" button. A user finger may be detected on a touch screen at a position corresponding to a position in which the GUI object is rendered. This detection is an interaction of the user with the GUI object. In response to the detection, an action is initiated which configures a computer device connected to the display which is connected to the touch screen to display a content, for example by playing a multimedia content, such as a movie.

In some embodiments an associated action is a predefined code module, identifier of a predefined code module, and the like. For example, in response to detecting an interaction with the GUI object, an identifier of a predefined code module is searched for, and subsequently executed. This allows modifying the code in the module without modifying code of the GUI object.

At S220, a compression level of the first GUI is determined. In an embodiment a compression level is compressibility of the first GUI. In some embodiments, determining a level of compression includes compressing a frame including the first GUI, the GUI object, and the like, and comparing the bit size of the compressed frame to a bit size of the uncompressed frame. In an embodiment, the frame may further include a content, such as an image, for example a test image.

In some embodiments, multiple frames are each compressed, each frame including a content and the first GUI, each content different for each frame. In certain embodiments the content is consecutive frames of a video file. In some embodiments, an average compression rate is determined by determining for each frame comprising the GUI and an image a compression rate, and calculating an average compression rate based on the individual compression rates. Likewise, it is possible to determine minimum compression values, and maximum compression values.

At S230, a second GUI is generated. In an embodiment, the second GUI is generated based on the GUI object of the first GUI. In certain embodiments the second GUI is generated by changing the layout of the first GUI. For example, a layout change includes, in an embodiment, decreasing a number of GUI objects, changing the size, relative size, position, and the like of a GUI object, and the like.

In some embodiments a constraint is further provided as additional input for generating the second GUI. In an embodiment a constraint is, for example, a percentage of an image shown (e.g. at least 20% of an image should be visible), a minimum object size (e.g. GUI objects should be larger than a predetermined dimension), a maximum object size, and the like.

In certain embodiments the second GUI is generated based on an associated action of another GUI object of the first GUI. For example, a second GUI object is generated, in an embodiment, based on an associated action of the first GUI object of the first GUI. In an embodiment, the second GUI object generated based on the associated action of the first GUI object includes a graphical element which is different from a graphical element of the first GUI object.

In certain embodiments a machine learning algorithm is applied to generate a GUI which best fits the input parameters (e.g., GUI objects and constraints). For example, a Random Forest implementation may be used to generate a plurality of potential second GUIs. A second GUI is selected which is closest to matching the constraints. An example is discussed in more detail below, for example with respect to FIG. 3.

At S240, a compression level of the second GUI is determined. In an embodiment, the compression level of the second GUI is determined utilizing the same method as determining the compression level of the first GUI. For example, where the compression level of the first GUI is determined by compressing a frame generated based on a sample content and a first GUI object, the compression level of the second GUI is determined by compressing a frame generated based on the sample content and a second GUI object. In an embodiment, a compression scheme used to compress the first GUI is used to compress the second GUI.

At S250, a comparison is generated between the compression level of the first GUI and the compression level of the second GUI. In an embodiment a plurality of second GUIs are generated, each having a respective compression level. In certain embodiments a comparison is generated between the compression level of each second GUI and the first GUI. In some embodiments, a comparison is generated between a plurality of second GUIs to determine the second GUI which has the highest compression level (i.e., is the most compressible). The compression level of the second GUI having the highest compression level is compared with the compression level of the first GUI.

In some embodiments, second GUIs are generated continuously until a second GUI is generated which has a compression level which is higher than the compression level of the first GUI.

In certain embodiments where a plurality of second GUIs are generated, a notification is generated to prompt a user to select one of the plurality of second GUIs, or select the first GUI. Upon receiving an input from the user indicating their choice of GUI, instructions are generated for rendering the chosen GUI.

Figure 3:
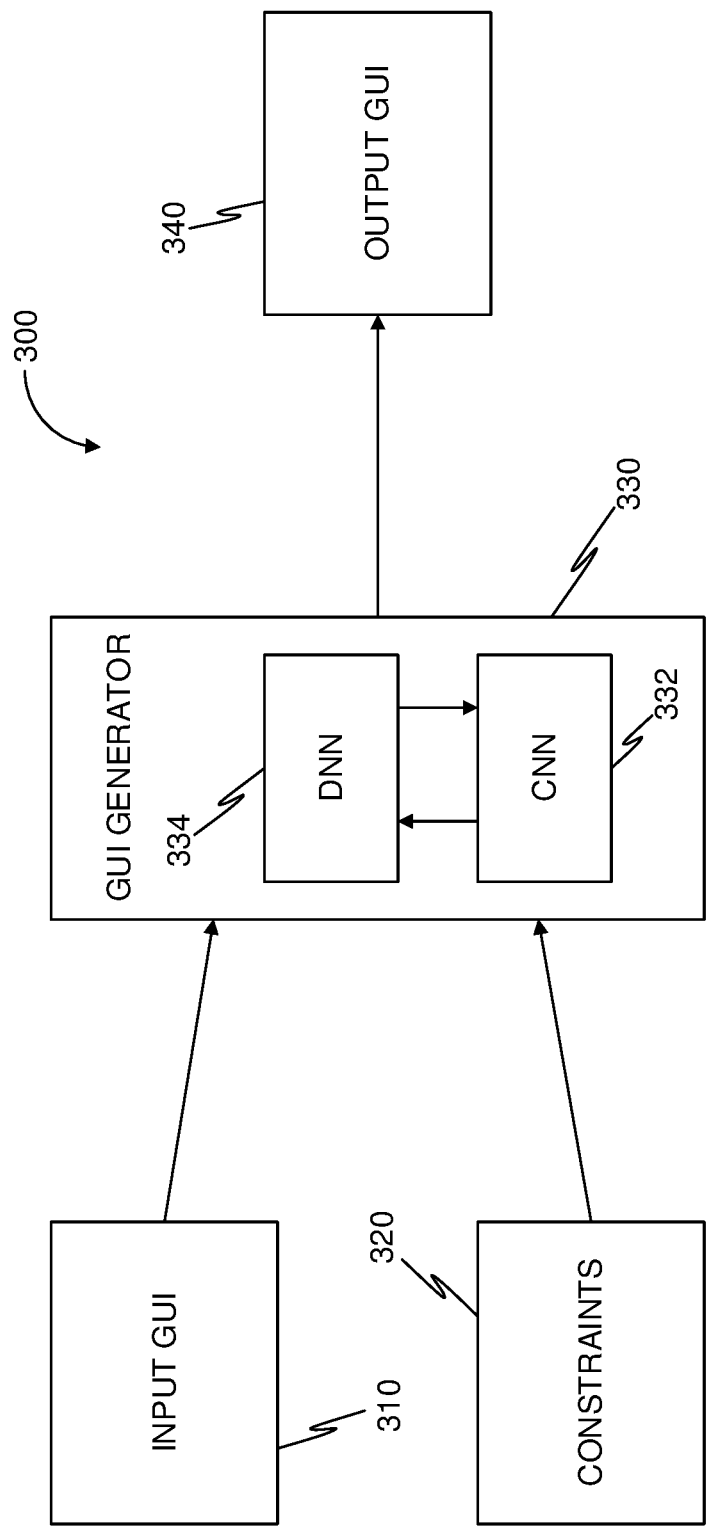
FIG. 3 is a schematic illustration of a system for generating a compressible GUI, implemented in accordance with an embodiment.

FIG. 3 is an example schematic illustration 300 of a system for generating a compressible GUI, implemented in accordance with an embodiment. A GUI generator 330 is configured to receive an input GUI 310. In an embodiment the GUI generator 330 is further configured to receive a constraint 320.

In certain embodiments, the input GUI 310 includes a GUI object. The GUI object includes, in an embodiment, a graphical element, a textual element, a location indicator, an associated action, a combination thereof, and the like. In an embodiment, constraints 320 are, for example, a percentage of an image shown, a minimum size of a GUI object, a maximum size of a GUI object, a color palate, and the like. For example, a constraint may specify that no GUI object should be: smaller than 10 by 10 pixels, no larger than one eighths of the total display area, and include a red color.

An embodiment describing a computing device which is configured to perform GUI generation is discussed in more detail in FIG. 7 below.

In an embodiment, the GUI generator 330 includes a Generative Adversarial Network (GAN). The GAN is a machine learning module, which includes a neural network model of a generator 334 and a neural network model of a discriminator 332. In an embodiment, the generator 334 is a deconvolutional neural network (DNN), and the discriminator 332 is a convolutional neural network (CNN). Throughout this disclosure the generator 334 may also be referred to as DNN 334, and the discriminator 332 may also be referred to as CNN 332.

The generator 334 is configured to generate a second GUI based on received inputs. In an embodiment, the received inputs are input GUI 310, constraints 320, a combination thereof, and the like. The discriminator 332 is configured to classify the second GUI based on the constraints 320. In certain embodiments a second GUI is classified into either complying with the constraints, or not complying with the constraints. In an embodiment, the DNN 334 is configured to generate a second GUI. The generated second GUI has a first GUI object and a second GUI object which are positioned one on top of the other. A constraint is, for example, that no GUI objects overlap when rendered. Therefore, the CNN 332 would output that the second GUI does not comply with the constraints. In an embodiment the DNN 334 is trained on the second GUI as a GUI which the CNN 332 classified as not complying.

In an embodiment, a constraint is received as a test, a rule, and the like, which can be applied on a generated second GUI. For example, an overlap constraint is received. In an embodiment, a check is performed to determine if a pixel, fragment, and the like are rendered based on a first GUI object and a second GUI object. If so, the first GUI object and the second GUI object likely overlap by at least that pixel.

In an embodiment, a second GUI which passes the discriminator 332 (i.e., is classified as complying with the constraints 320) is provided as an output GUI 340. In an embodiment the output GUI 340 is rendered on a display. In some embodiments, a user input may be provided which indicates if the output GUI 340 is accepted or rejected. In certain embodiments the discriminator 332 is trained based on the user input respective of the output GUI 340. In an embodiment, the output GUI 340 includes an associated action of the input GUI 310. In certain embodiments, a constraint 320 is for the generated GUI to have a compression level which is higher than the compression level of the input GUI 310.

In certain embodiments the GUI generator 330 is further configured to generate recommendations based on an output GUI 340. In an embodiment, the recommendation is generated based on a detected difference between the input GUI 310 and the output GUI 340. For example, detection may be based on detecting a first GUI object having an associated action in the input GUI 310, detecting a second GUI object having the associated action in the output GUI 340, and comparing attributes of the first GUI to the second GUI. For example, an attribute of a GUI object may be a graphical element, a size, a position, and the like.

Figure 4:
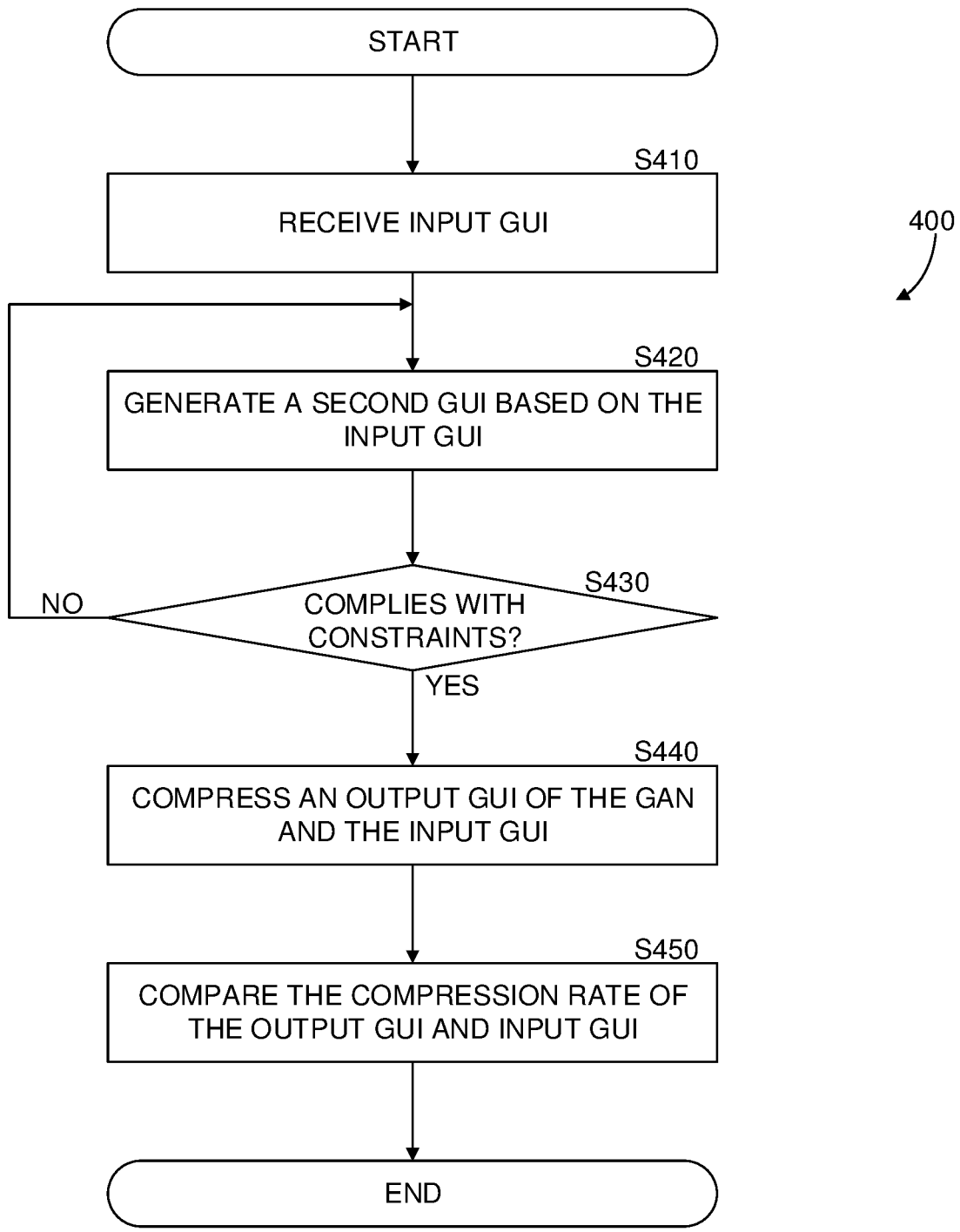
FIG. 4 is a flowchart of a method for generating a second GUI based on a first GUI, implemented in accordance with an embodiment.

FIG. 4 is an example flowchart 400 of a method for generating a second GUI based on a first GUI, implemented in accordance with an embodiment. In an embodiment, machine learning techniques, such as Random Forest, artificial neural networks, and the like, are utilized to generate a second GUI.

At S410 an input GUI is received. In an embodiment, the input GUI is received as an input for a GUI generator. The input GUI includes a GUI object, and a location indicator of the GUI object in a frame. In an embodiment the GUI object is rendered on a display in a position which is based on the location indicator. A location indicator is, for example, a coordinate set, a relative coordinate set, and the like. The placement of GUI objects within a frame is also referred to as a GUI layout.

In some embodiments, a GUI object further includes an associated action. An associated action is, for example, a code or other computer instruction. In certain embodiments, interacting with a GUI object initiates execution of the associated action. For example, a GUI object may be a "PLAY" button. A user finger may be detected on a touch screen at a position corresponding to a position in which the GUI object is rendered. This detection is an interaction of the user with the GUI object. In response to the detection, an action is initiated which configures a computer device connected to the display which is connected to the touch screen to display a content, for example by playing a multimedia content, such as a movie.

In some embodiments an associated action is a predefined code module, identifier of a predefined code module, and the like. For example, in response to detecting an interaction with the GUI object, an identifier of a predefined code module is searched for, and subsequently executed. This allows modifying the code in the module without modifying code of the GUI object.

At S420, a second GUI is generated. In an embodiment, the second GUI is generated by utilizing a generative adversarial network (GAN). In certain embodiments, the second GUI may be generated by providing the one or more objects of the input GUI to a generator neural network of the GAN. In an embodiment, the second GUI is generated by further providing one or more constraints to the GAN.

In certain embodiments the second GUI is generated by changing the layout of the input GUI. For example, a layout change includes, in an embodiment, decreasing a number of GUI objects, changing the size, relative size, position, and the like of a GUI object, and the like.

In some embodiments a constraint is further provided as additional input for generating the second GUI. In an embodiment a constraint is, for example, a percentage of an image shown (e.g. at least 20% of an image should be visible), a minimum object size (e.g. GUI objects should be larger than a predetermined dimension), a maximum object size, and the like.

In certain embodiments the second GUI is generated based on an associated action of another GUI object of the input GUI. For example, a second GUI object is generated, in an embodiment, based on an associated action of the first GUI object of the input GUI. In an embodiment, the second GUI object generated based on the associated action of the first GUI object includes a graphical element which is different from a graphical element of the first GUI object.

At S430, a check is performed to determine if the second GUI complies with a constraint. In an embodiment, the check is performed by a discriminator neural network of a GAN. In some embodiments, a constraint is provided to a rule engine which is configured to apply the rule to the second GUI to determine if the second GUI complies with the constraints. A constraint may be, for example, a percentage of an image shown (e.g. at least 20% of an image should be visible), a minimum object size (e.g. GUI objects should be larger than a predetermined dimension), a maximum object size, and the like.

If the second GUI complies execution continues at S440. In an embodiment, if the second GUI does not comply with a constraint, execution continues at S420, and another second GUI is generated.

At S440, each of the second GUI and input GUI are compressed. In an embodiment, the second GUI and the input GUI are compressed utilizing the same compression schema. The second GUI and input GUI are compressed, in an embodiment, using one or more methods of compression. In an embodiment the second GUI and the input GUI are each compressed as part of a frame which includes other objects, such as images, video frames, and the like.

In certain embodiments a plurality of compressions may be performed for each GUI, combining different objects, images, or video frames. For example the input GUI may be compressed with a first object using a first compression scheme, a second compression scheme, and a third compression scheme, to compare the results of each compression scheme. The second GUI may then be compressed with the first object, likewise using the first, second, and third compression schemes. Results, i.e., sizes of compressed frames, are compared in an embodiment to determine which compression scheme provides the most compression.

In other embodiments, the input GUI is compressed with a first object using a first compression scheme, and compressed with a second object using the first compression scheme. The second GUI is compressed with the first object using the first compression scheme, and with the second object using the first compression scheme.

At S450, a compression rate of the second GUI is compared to a compression rate of the input GUI. In an embodiment, comparison is performed to determine if the second GUI achieves a higher compression rate (i.e., smaller file size) than the input GUI. In some embodiments, an output GUI is generated. In an embodiment the output GUI is rendered on a display. In some embodiments, the output GUI includes a recommendation. The recommendation includes, for example, a comparison between the input GUI and the second GUI. For example, the recommendation is generated based on a predetermined text, and includes an indicator on a difference between the input GUI and the second GUI. A difference may be, for example, that a second GUI object of the second GUI is rendered smaller than a corresponding first GUI object of the input GUI. As another example, a difference may be that a second GUI object has a primarily green color palette, while a corresponding first GUI object has a primarily blue color palette.

In an embodiment the compression scheme utilized to compress the input GUI and the second GUI is a block compression scheme. A block compression technique reduces texture size and reduces memory usage. Pixels of the display are divided into blocks, each block containing a number of pixels in a square or rectangular area. This type of compression is effective where the difference in the values of individual pixels within a given block is low. The higher the difference in value of the individual pixels, the lower the ability to compress the information without loss.

In an embodiment the block compression allows compressing different blocks individually e.g., by extracting a set of representative base colors (also called codewords) for each block of pixels. The number of the extracted codewords may be one or more. In some embodiments, the block compression process includes additional parameters, conditions, and the like, e.g., how the codewords should be interpolated in order to represent the colors of a pixel in a particular block with minimal visual artifacts.

In an embodiment, compression parameters are defined by a GUI generator. In some embodiments, the GUI generator is configured to apply the same compression parameters for two neighboring blocks. Blocks are neighboring if they share a side. In certain embodiments, the GUI generator is configured to set the same compression parameters for all the blocks in which a particular GUI object is rendered.

In some embodiments, the GUI generator is configured to define the size of the compressed block. For example, a block defined as 4×4 pixels is utilized in an embodiment. In an embodiment, various arrangements of image block sizes are utilized, such as two-by-eight image blocks, eight-by-two image blocks, and the like.

Figure 5:
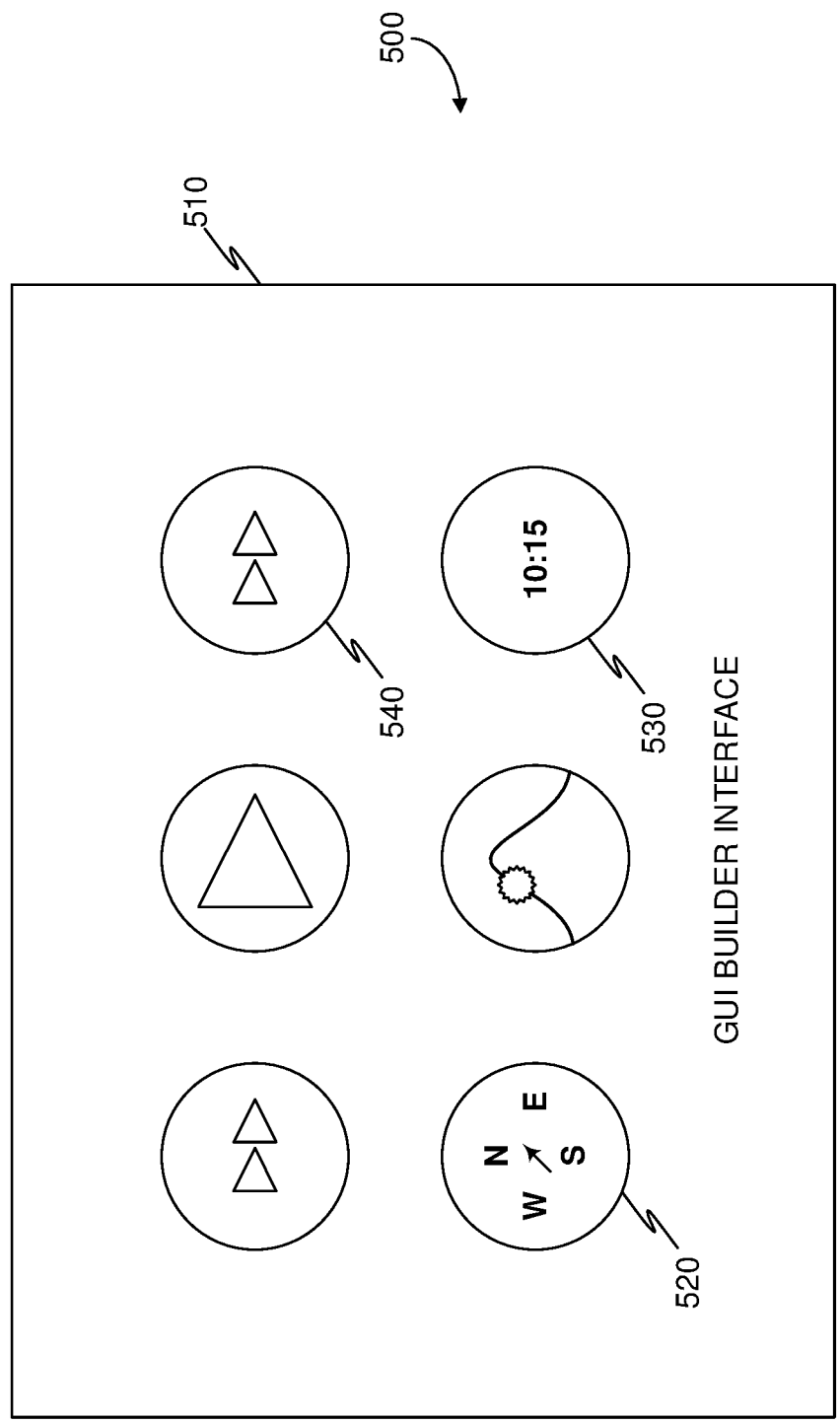
FIG. 5 is a schematic illustration of a graphical user interface providing compressible widgets, implemented in accordance with an embodiment.

FIG. 5 is an example of a schematic illustration 500 of a graphical user interface 510 providing compressible widgets, implemented in accordance with an embodiment. The graphical user interface (GUI) 510 includes a plurality of compressible widgets. In an embodiment, a compressible widget is a GUI object previously determined to be compressible above a predetermined compression threshold. For example, a GUI generator is configured, in an embodiment, to compress a GUI object and determine a rate of compression (i.e., how compressible an object is). In an embodiment the rate of compression is compared to a compression threshold, and a GUI object having a compression rate higher than the compression threshold is defined as compressible.

In an embodiment, the GUI 510 includes widgets represented as individual icons, such as a first GUI object 520, a second GUI object 530, a third GUI object 540, and the like.

In an embodiment, a GUI generator is configured to receive a selection input to indicate that a GUI object should be included for generating a particular GUI. In an embodiment, the selection further includes a code, instruction set, code module, software, and the like, which is associated with the GUI object.

For example, the first GUI object 520 is a compass widget, which in an embodiment is configured to receive sensor data from a magnetometer as an input. In an embodiment the widget (i.e., first GUI object 520) includes an associated action, such as code which when executed by a processor causes the graphic representation of the widget to alter based on the input from the magnetometer. For example, the compass widget 520 includes letters "N", "E", "S", "W" and an arrow, where the direction the arrow points is changed (i.e., via rendering a different image) in response to receiving sensor data from a magnetometer indicating that a direction change has occurred.

As another example, the second GUI object 530 is a clock element. In an embodiment a code function which is associated with the second GUI object 530 receives input data from a clock connected to a processing circuit. The clock widget 530 (i.e., second GUI object 530) is configured, in an embodiment, to change appearance, color, etc. based on input received from the processor clock. In an embodiment changing a widget includes an instruction which when executed by a processing circuitry, such as a GPU, renders an image or series of images which replace a current image or other graphical element of the widget.

In another example, the third GUI object 540 is a fast-forward action button. In response to receiving an input, such as from a touchscreen or a pointing device (e.g., a computer mouse), a content such as a video or audio is played. For example, playing the content is performed in an embodiment by a computer device configured to display a GUI including the third GUI object 540. In an embodiment receiving input associated with the third GUI object 540 configures the computer device to initiate an action, for example including executing software, which causes playback of the content to change (accelerate or play the next media, for example).

By providing GUI objects which are already determined to be compressible, for example for a specific processing circuitry, such as a GPU, the time to deploy the GUI is reduced, thereby increasing the efficiency in which a device can be deployed to end users. Furthermore, a GUI including compressible GUI objects includes the advantages discussed herein, such as reducing memory required to store the GUI.

Figure 6:
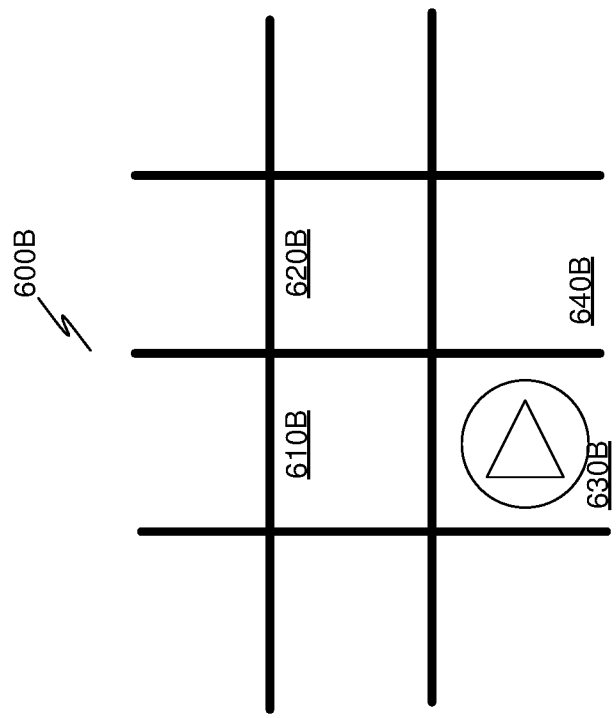
FIG. 6 is a schematic illustration of a GUI recommendation generated by a GUI generator.
Figure 6:
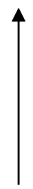
Figure 6:
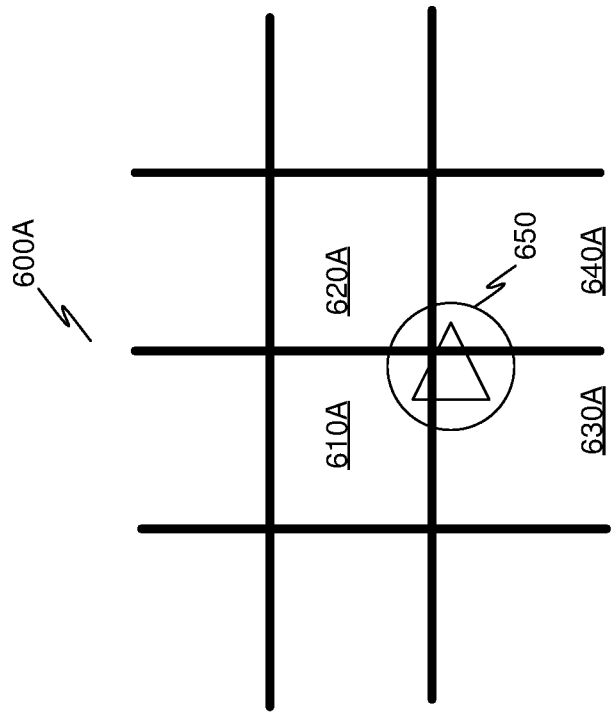

FIG. 6 is an example schematic illustration of a GUI recommendation generated by a GUI generator. In an embodiment a first partial view of a display area 600A and a second partial view of the same display area 600B include a GUI object 650. In an embodiment the GUI object 650 includes a graphical element, an associated action, and an identifier. The graphical element may be, for example, a "Play" button.

In the first partial view of the display area 600A the GUI object 650 is rendered on a first block 610A, a second block 620A, a third block 630A, and a fourth block 640A. Since block compression is affected by a range in pixel values (i.e., larger range leads to less lossless compressibility), rendering the GUI object 650 in all four blocks reduces each block's compressibility. Alternatively, rendering the GUI object 650 in all four blocks can lead to artifact generation in an embodiment where the range of pixel values is above a threshold. A pixel value range is defined as the values between the highest value pixel and the lowest value pixel.

In an embodiment, a GUI generator is configured to generate a second GUI, having a GUI object corresponding to the GUI object 650 in another position, which is not the position of the GUI object 650. For example, the instructions to render the GUI object 650 are updated to render GUI object 650 in a third block 630B, which corresponds to the third block 630A. In an embodiment, moving the position of the GUI object 650 allows to better compress blocks 610B (corresponding to 610A), 620B (corresponding to 620A), and 640B (corresponding to 640A). In an embodiment a GUI object is detected as being rendered on a first plurality of blocks. Generating a second GUI, including a GUI object which is generated on a subset of the first plurality of blocks, increases the compressibility of the second GUI relative to the first GUI. In an embodiment the subset of the first plurality of blocks includes some, but not all, of the blocks of the first plurality of blocks.

In some embodiments the GUI generator is further configured to generate a recommendation based on a color of the GUI object 650, a color of a background, illumination of a color, and the like. For example, the GUI generator is configured to generate a recommendation which includes a GUI where the GUI object 650 occupies less blocks, and also to change the color palette of the GUI object based on a background image.

Figure 7:
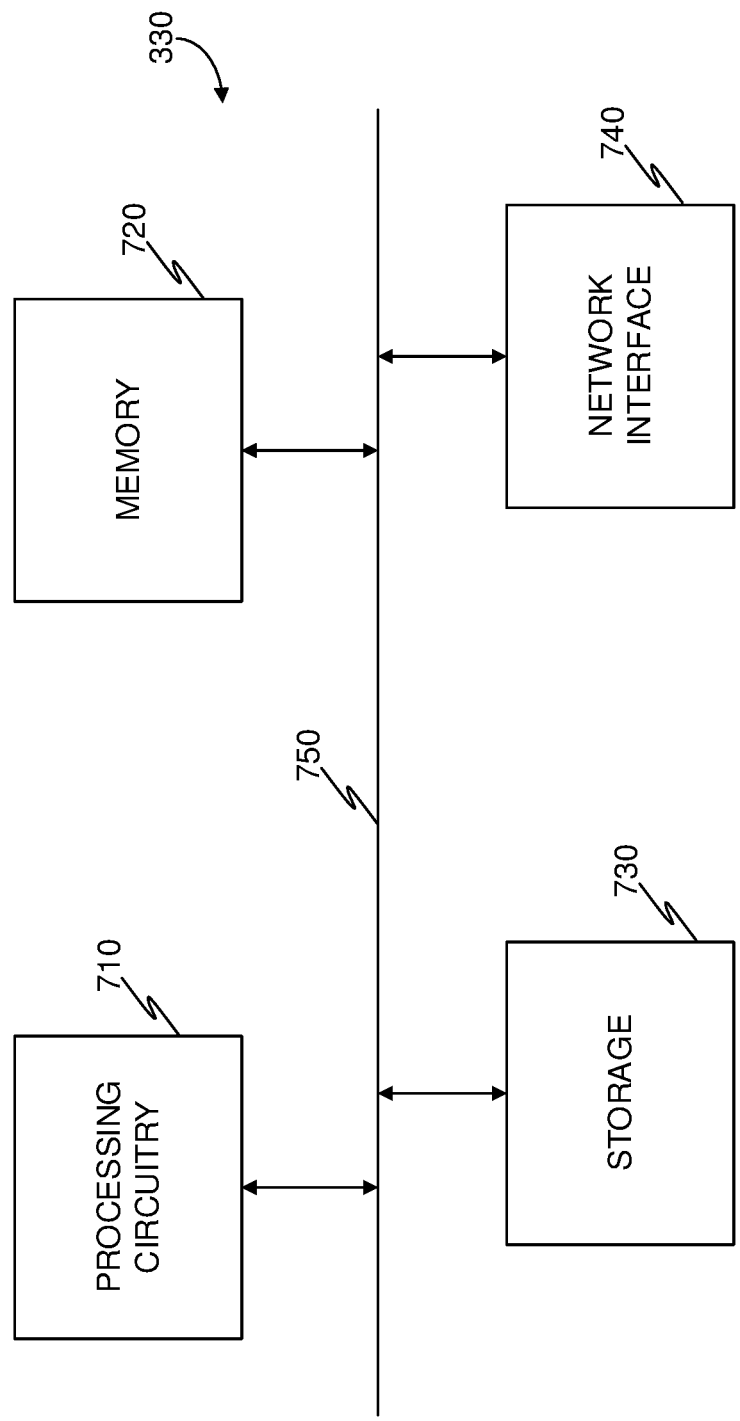
FIG. 7 is a schematic diagram of a GUI generator according to an embodiment.

FIG. 7 is an example schematic diagram of a GUI generator 330 according to an embodiment. The GUI generator 330 includes a processing circuitry 710 coupled to a memory 720, a storage 730, and a network interface 740. In an embodiment, the components of the GUI generator 330 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, or any other medium which can be used to store the desired information.

The network interface 740 allows the GUI generator 330 to communicate with, for example, a computer device on which a GUI generated by the GUI generator is displayed.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improved compression of a graphical user interface (GUI), comprising:
  receiving a first graphical user interface (GUI), the first GUI including a GUI object;
  compressing the first GUI, wherein the compressed first GUI is associated with a first compression ratio;

generating a second GUI based only on GUI objects of the first GUI, including the GUI object of the first GUI, wherein the second GUI is different from the first GUI;

compressing the second GUI, wherein the compressed second GUI is associated with a second compression ratio;

generating an instruction which when executed configures a computer device to render the second GUI, only in response to determining that the second compression ratio is higher than the first compression ratio; and generating an instruction which when executed configures the computer device to render the first GUI, only in response to determining that the second compression ratio is lower than the first compression ratio.

2. The method of claim 1, wherein the GUI object further includes any one of: a position indicator, a color, a color palette, a graphical element, an associated action, a software module, a computer code, and a combination thereof.

3. The method of claim 1, wherein the first GUI and the second GUI are each compressed using the same compression scheme.

4. The method of claim 1, wherein the second GUI is generated by a generative adversarial network (GAN).

5. The method of claim 1, further comprising:
generating a plurality of second GUIs, each second GUI having a unique compression ratio; and
generating an instruction which when executed configures the computer device to render the first GUI, in response to determining that the first compression ratio is equal to or higher than each of the second compression ratios.

6. The method of claim 1, wherein the second GUI includes an instruction to render the GUI object in a predetermined position.

7. The method of claim 1, wherein second GUI includes an instruction to render the GUI object in a predetermined size.

8. The method of claim 7, wherein the predetermined size is between a first area size and a second area size.

9. The method of claim 1, further comprising:
determining a file size of the first GUI;
determining a file size of the first compressed GUI; and
generating the first compression ratio based on the determined file size of the first GUI and the determined file size of the compressed first GUI.

10. The method of claim 1, further comprising:
detecting that a first GUI object of the first GUI is rendered on a first plurality of blocks, each block including an area defined by pixels of a display; and
generating the second GUI including a second GUI object corresponding to the first GUI object, wherein the second GUI object is rendered on a subset of the first plurality of blocks.

11. A non-transitory computer readable medium having stored thereon instructions for causing a processing circuitry to execute a process, the process comprising:
receiving a first graphical user interface (GUI), the first GUI including a GUI object;
compressing the first GUI, wherein the compressed first GUI is associated with a first compression ratio;
generating a second GUI based only on GUI objects of the first GUI, including the GUI object of the first GUI, wherein the second GUI is different from the first GUI;
compressing the second GUI, wherein the compressed second GUI is associated with a second compression ratio;
generating an instruction which when executed configures a computer device to render the second GUI, only in response to determining that the second compression ratio is higher than the first compression ratio; and
generating an instruction which when executed configures the computer device to render the first GUI, only in response to determining that the second compression ratio is lower than the first compression ratio.

12. A system for improved compression of a graphical user interface (GUI), comprising:
a processing circuitry; and
a memory, the memory containing instructions that, when executed by the processing circuitry, configure the system to:
receive a first graphical user interface (GUI), the first GUI including a GUI object;
compress the first GUI, wherein the compressed first GUI is associated with a first compression ratio;
generate a second GUI based only on GUI objects of the first GUI, including the GUI object of the first GUI, wherein the second GUI is different from the first GUI;
compress the second GUI, wherein the compressed second GUI is associated with a second compression ratio;
generate an instruction which when executed configures a computer device to render the second GUI, only in response to determining that the second compression ratio is higher than the first compression ratio; and
generate an instruction which when executed configures the computer device to render the first GUI, only in response to determining that the second compression ratio is lower than the first compression ratio.

13. The system of claim 12, wherein the GUI object further includes any one of: a position indicator, a color, a color palette, a graphical element, an associated action, a software module, a computer code, and a combination thereof.

14. The system of claim 12, wherein the first GUI and the second GUI are each compressed using the same compression scheme.

15. The system of claim 12, wherein the second GUI is generated by a generative adversarial network (GAN).

16. The system of claim 12, wherein the memory contains further instructions which when executed by the processing circuitry further configure the system to:
generate a plurality of second GUIs, each second GUI having a unique compression ratio; and
generate an instruction which when executed configures the computer device to render the first GUI, in response to determining that the first compression ratio is equal to or higher than each of the second compression ratios.

17. The system of claim 12, wherein the second GUI includes an instruction to render the GUI object in a predetermined position.

18. The system of claim 12, wherein second GUI includes an instruction to render the GUI object in a predetermined size.

19. The system of claim 18, wherein the predetermined size is between a first area size and a second area size.

20. The system of claim 12, wherein the memory contains further instructions which when executed by the processing circuitry further configure the system to:
determine a file size of the first GUI;
determine a file size of the first compressed GUI; and
generate the first compression ratio based on the determined file size of the first GUI and the determined file size of the compressed first GUI.

21. The system of claim 12, wherein the memory contains further instructions which when executed by the processing circuitry further configure the system to:

detect that a first GUI object of the first GUI is rendered on a first plurality of blocks, each block including an area defined by pixels of a display; and generate the second GUI including a second GUI object corresponding to the first GUI object, wherein the second GUI object is rendered on a subset of the first plurality of blocks.

\* \* \* \* \*